J. E. GRAY.
CONTROLLING DEVICE FOR AUTOMOBILE HEADLIGHTS.
APPLICATION FILED OCT. 13, 1920.
1,398,262.
Patented Nov. 29, 1921.
2 SHEETS—SHEET 1.
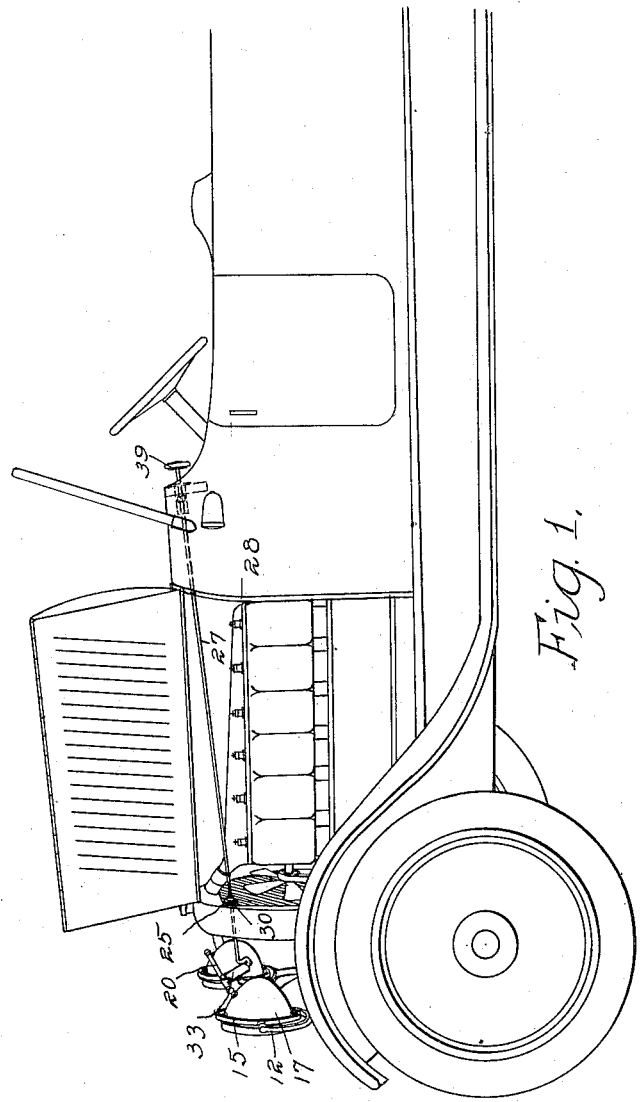
Inventor
James E Gray
by Onvig & Hague, Attorneys J. E. GRAY.
CONTROLLING DEVICE FOR AUTOMOBILE HEADLIGHTS.
APPLICATION FILED OCT. 13, 1920.
1,398,262.
Patented Nov. 29, 1921.
2 SHEETS—SHEET 2.
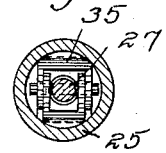
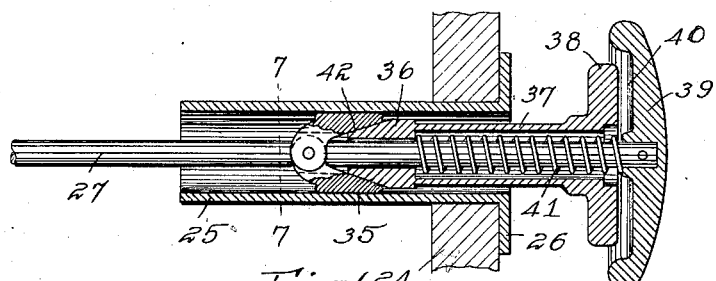
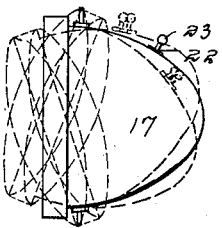
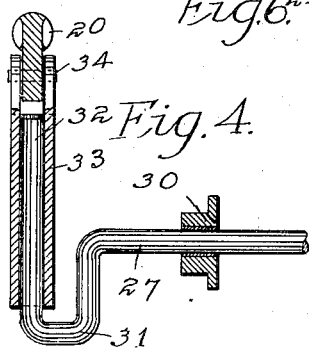
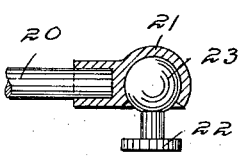
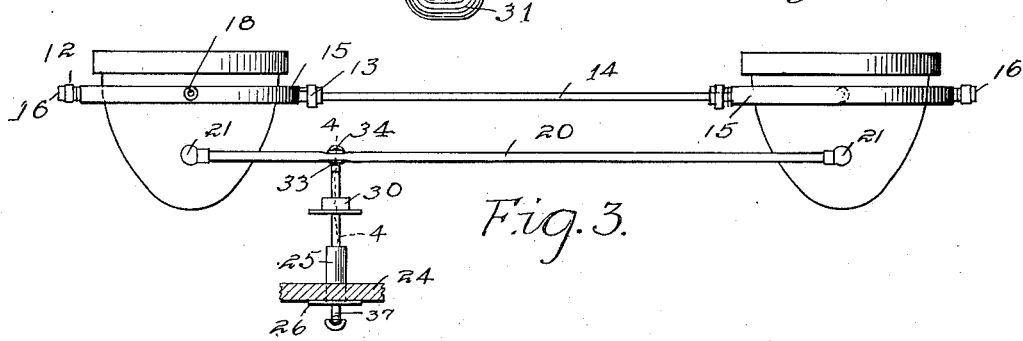
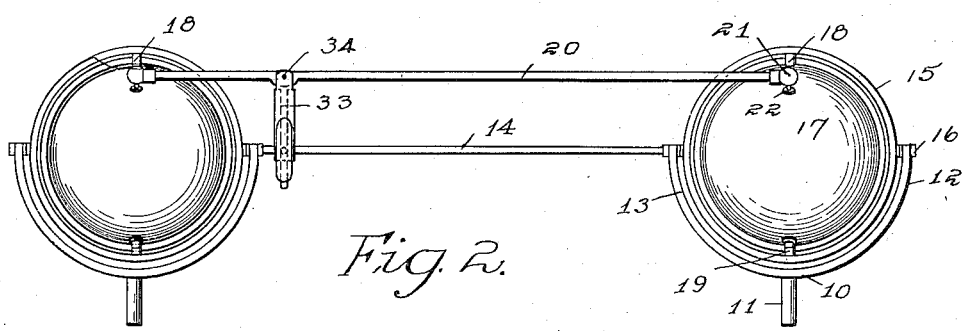
Inventor
James E. Gray
by Orwig & Hague Attorneys

UNITED STATES PATENT OFFICE.

JAMES E. GRAY, OF NEWTON, IOWA.

CONTROLLING DEVICE FOR AUTOMOBILE-HEADLIGHTS.

1,398,262. Specification of Letters Patent. Patented Nov. 29, 1921.

Application filed October 13, 1920. Serial No. 416,709.

*To all whom it may concern:*

Be it known that I, JAMES E. GRAY, a citizen of the United States, and resident of Newton, in the county of Jasper and State of Iowa, have invented a certain new and useful Controlling Device for Automobile-Headlights, of which the following is a specification.

The object of my invention is to provide a controlling mechanism for automobile headlights, of simple, durable and inexpensive construction, so constructed and arranged that the driver may manually throw the projecting rays of the light either vertically or horizontally, or to effect both movements simultaneously.

A further object is to provide in connection with devices for mounting headlights so that universal movement may be imparted thereto, new and improved mechanism for producing said universal movement from a position adjacent to or near the dashboard.

A further object is to provide a new and improved mechanism for mounting automobile headlights so that the lamps may be tilted and oscillated to throw the projecting rays either vertically or horizontally.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of the forward end of an automobile, showing my improved lamp supporting and controlling device in position.

Fig. 2 is a rear elevation of my improved supporting devices for headlights, showing a portion of the controlling mechanism.

Fig. 3 is a plan view of the same.

Fig. 4 is a detail sectional view, taken on the line 4—4 of Fig. 3.

Fig. 5 is a detail sectional view showing one end of the operating rod and the member for connecting the same with the lamp.

Fig. 6 is a longitudinal sectional view of my improved locking device.

Fig. 7 is a transverse sectional view, taken on the line 7—7 of Fig. 6; and

Fig. 8 is a diagrammatic view of one of the headlights detached from the supporting member, showing a number of positions, in dotted lines, to which the lamp may be moved.

My improved lamp supports comprise brackets 10 having downwardly extending members 11 which are designed to be secured to the frame members of the automobile body in the usual manner.

The bracket 10 is provided with two upwardly projecting prongs 12 and 13. The prongs 13 are designed to receive a shaft 14, which is rotatably mounted therein, and each end of the shaft 14 is rigidly secured to an annular member 15. The opposite side of the member 15 from that to which the shaft 14 is attached, is provided with a pivot 16 which is pivotally mounted in the upper end of the member 12. The member 15 is of a diameter slightly greater than the diameter of the lamp member 17, which is of the ordinary construction designed for electric lights. Each of the lamp members 17 is provided with an upper pivot 18 and a lower pivot 19. The pivots 18 and 19 are mounted in the member 15, as shown in Figs. 2 and 3, and are in a line extending through the center of the lamp and at right angles to the pivot center of the shaft 14.

By this arrangement it will be seen that the members 17 may be tilted on their horizontal axes to throw the rays of light vertically, or they may be rotated on the pivots 18 and 19 to throw the rays of light horizontally. The shaft 14 will cause the members 17 to be moved in unison, so far as the vertical movement of the light is concerned. To move said lamps in unison on their vertical pivots, I have provided a rod 20, each end of which is provided with a socket 21, the distance between the centers of said sockets being equal to the horizontal distance between the vertical pivots. Each of the lamp members 17 is provided with a post 22, which is riveted in position and has a ball 23 designed to enter the socket member 21. The post 22 is preferably secured to the top side of the lamp, in a plane on the vertical pivots and at an angle of substantially forty-five degrees from the vertical center of said vertical pivots. By this arrangement of the posts they will be placed back of the pivots 18 a distance sufficient so that longitudinal movement of the rod 20 will cause the lamps to be moved about their vertical pivots and in unison.

It will also be seen that by this placing of the post 22 it will rest at a point considerably above the horizontal plane passing through the horizontal pivots, so that a transverse movement of the rod 20 will cause the lamps and the members 15 to be rotated on said horizontal pivots, and thus by operating the rod 20 a horizontal or vertical movement may be imparted to the projecting rays of light.

For actuating the rod 20 I have provided the following mechanism: Secured to the dashboard 24 I have provided a cylindrical tube 25, having a flange 26 by which the tube is secured to the said board, the tube 25 being preferably mounted through an opening therein. The tube 25 is designed to receive a rod 27, which is so located that it will pass through the front board 28 and through the radiator 29, between the tubes and at a position to one side of the engine. The rod 27 is designed to be slidably and rotatably mounted in a bearing 30 secured to said radiator. The forward end of the rod 27 is provided with a right-angled U-position 31, having an extended lug 32. This lug 32 is designed to rest in position beneath the rod 20, and is operatively connected thereto by means of a sleeve member 33 which is slidably mounted thereon and has one end pivoted to the rod 20 by means of a pivot 34.

To permit the rod 27 to pass to one side of the engine, the point of connection between the member 32 and the rod 27 is at a point near one end of the rod 20, as shown in Figs. 2 and 3. By this construction it will be seen that as the rod 27 is moved longitudinally the rod 20 will be moved transversely, which will cause the members 15, together with the lamp members 17, to be tilted on a horizontal axis. This rod 20 will have a slight upward and downward movement at the same time, which will be taken care of by the slidable connection between the lug 32 and the sleeve 33.

It will also be seen that if the rod 27 is slightly rotated, the upper end of the lug 32 will be oscillated, causing the rod 20 to be moved longitudinally. As before, a slight movement will be produced between the members 32 and 33.

By employing the rod 14 in connecting the members 15 rigidly thereto, it is possible to locate the pivot point 34 at any position on the rod 20 as may be required to meet the conditions of various makes and designs of machines, and yet at the same time swing the lamps in unison about their horizontal axes.

If pressure sufficient to rock the shaft 14 is applied longitudinally to the rod 27, the said rod being pivoted at a position near one end of the rod 20, a greater amount of power would be applied to the left-hand light, as shown in Fig. 3, than to the right-hand light, due to the difference in leverage of the two ends of said rod. This would have a tendency to cause the left-hand lamp to be moved through a greater angle than the right-hand lamp. This tendency is overcome and equalized by the shaft 14 being rigidly connected to the annular members 15.

For locking the rod 27 in any of its positions of movement, I have provided shoes 35 pivoted thereto and designed to engage the interior of the tube 25. For operating the shoes I have provided a wedge member 36, slidably mounted on the shaft 27 and provided with a sleeve 37 having a handle 38. The end of the rod 27 is provided with a handle 39 which has a recess 40 designed to receive the handle member 38. For automatically holding the wedge 36 in operative position, I have provided a coil spring 41. Thus it will be seen that the spring 41 will move the wedge against the inclined faces 42 of the shoes 35 and cause their outer faces to engage the inner side of the tube, thereby locking the rod 27 against either rotary or longitudinal movement.

When it is desired to operate the rod 27, the operator places the handle 39 in the palm of his hand, and places his fingers over the handle 38, and by gripping movement causes the wedge 36 to disengage the shoes 35 against the action of the spring 41. A rotary or longitudinal movement may then be imparted to the rod 27 by means of the handle 39, and the position of the lights 17 adjusted at the will of the operator and independently of any mechanism such as is usually employed for operating devices of this kind.

Thus it will be seen that I have provided a simple and inexpensive means for mounting the lamps on pivoted members which may be very easily and quickly adjusted so that the projecting rays from the lamp may be moved to follow curves in the road before the automobile has reached such curves, or the lights may be thrown downwardly when passing another car on the road, to prevent blinding the driver and at the same time providing sufficient light for driving; or the lights may be tilted upwardly and transversely so that the driver of the car may read signboards alongside the road, either while the car is in motion or standing still.

It also obviates the necessity of carrying an extra light such as is commonly known as a spot light.

I claim as my invention:

1. In a device of the class described, a plurality of supports, a horizontal shaft pivoted in said supports, a bracket on each end of said shaft, a lamp mounted in said brackets by vertical pivots near its forward face, means for operating said lamps in unison comprising a rod parallel with said shaft and attached to each of said lamps by ball and socket members at a point above said horizontal shaft and behind said vertical pivots, means for imparting longitudinal and lateral movement to said rod comprising a rod arranged transversely with the first said rod and provided at one end with pivoted and telescopic means for operatively connecting said rods and at the other end with means for operating said transverse rod and means for locking said transverse rod against movement.

2. In a device of the class described, a plurality of supports, a horizontal shaft pivoted in said supports, a bracket on each end of said shaft, a lamp vertically pivoted in each of said brackets, means for operating said lamps in unison comprising a rod parallel to said shaft and attached to the body portion of each of said lamps by a universal pivot substantially midway between the vertical axis and a horizontal central line through said lamps perpendicular to said vertical axis, means for imparting longitudinal and lateral movement to said rod comprising a rod arranged transversely with the said first rod having one end adjacent and provided with a right angular extension, a sleeve slidably mounted on said extension and pivotally connected to the first said rod, means for rotating, or moving said second rod longitudinally, means for locking said second rod.

3. The combination of a plurality of lamps for projecting rays of light, a support for mounting each of said lamps on two sets of pivots, a rod operatively connected to said lamps and capable of longitudinal movement to move said lamps on one set of pivots and also capable of slightly rocking movement to operate the lamps on the other set of pivots, a support for said rod, a device for locking said rod against movement relative to said supporting means, means for operating said rod comprising a handle member fixed to one end of said rod and designed to fit the palm of an operator's hand, and means for operating the locking device comprising a sleeve slidably mounted on said shaft and operatively connected to said locking device, having laterally extending handles designed to rest adjacent to first said handle and designed to be grasped by the operator's fingers to produce longitudinal movement of said sleeve in one direction and yielding means for forcing the sleeve in the opposite direction to operate the locking device.

Des Moines, Iowa, October 7, 1920.

JAMES E. GRAY.